May 22, 1934.                R. HOE                1,959,427
                        SHELLING APPARATUS
                       Filed Jan. 2, 1930         2 Sheets-Sheet 2
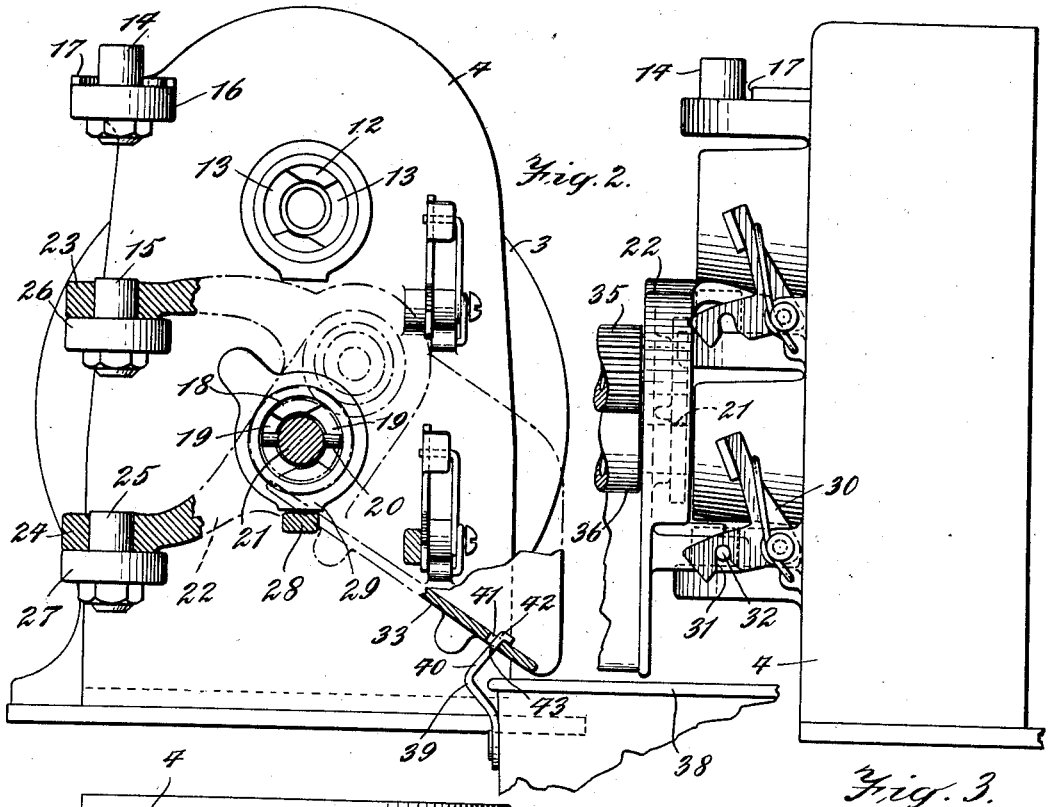
Fig. 2.
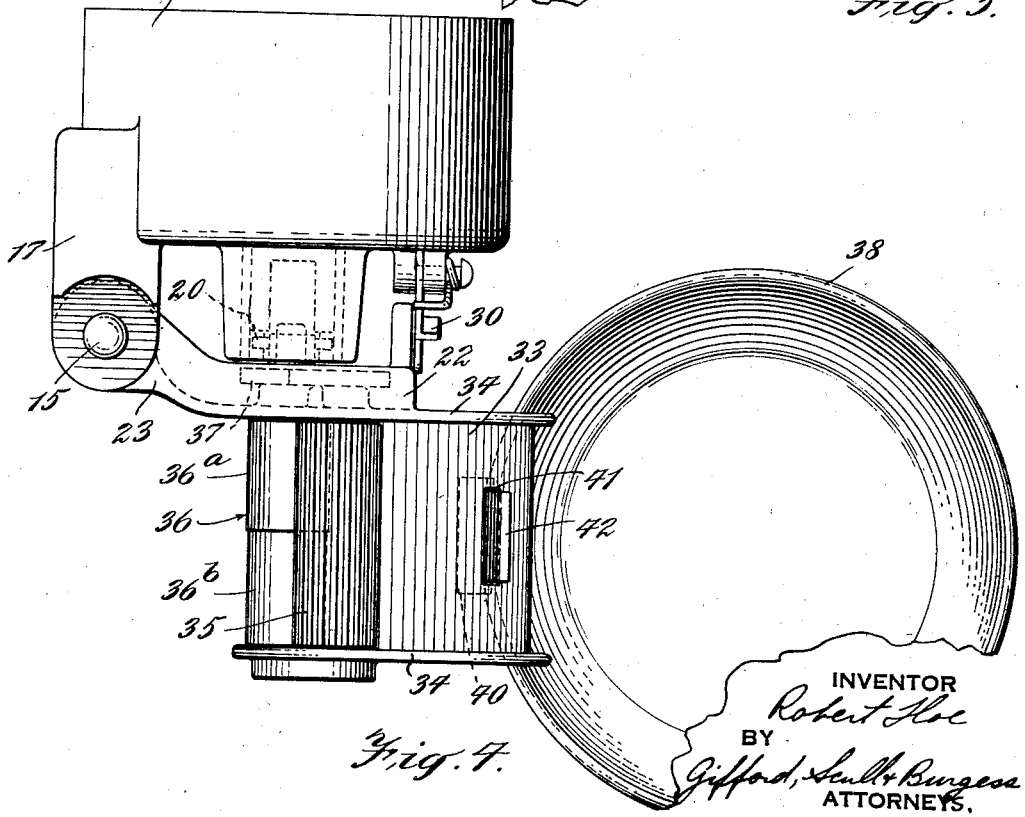
Fig. 3.
Fig. 4.
INVENTOR
Robert Hoe
BY
Gifford, Scull & Burgess
ATTORNEYS.

Patented May 22, 1934

1,959,427

UNITED STATES PATENT OFFICE 1,959,427

SHELLING APPARATUS

Robert Hoe, Hyde Park, N. Y.

Application January 2, 1930, Serial No. 418,108

7 Claims. (Cl. 130—30)

This invention relates to a novel and improved shelling apparatus, particularly adapted for shelling pod vegetables such as peas or beans, and the novel features of the invention will be best understood from the following description and the annexed drawings, in which I have shown a selected embodiment of the invention and in which;

Fig. 2 is a view partly in elevation and partly in section, taken from the left of Fig. 1.

Fig. 3 is a view taken from the right of Fig. 2.

Fig. 4 is a plan view of the shelling apparatus.

Figure 1:
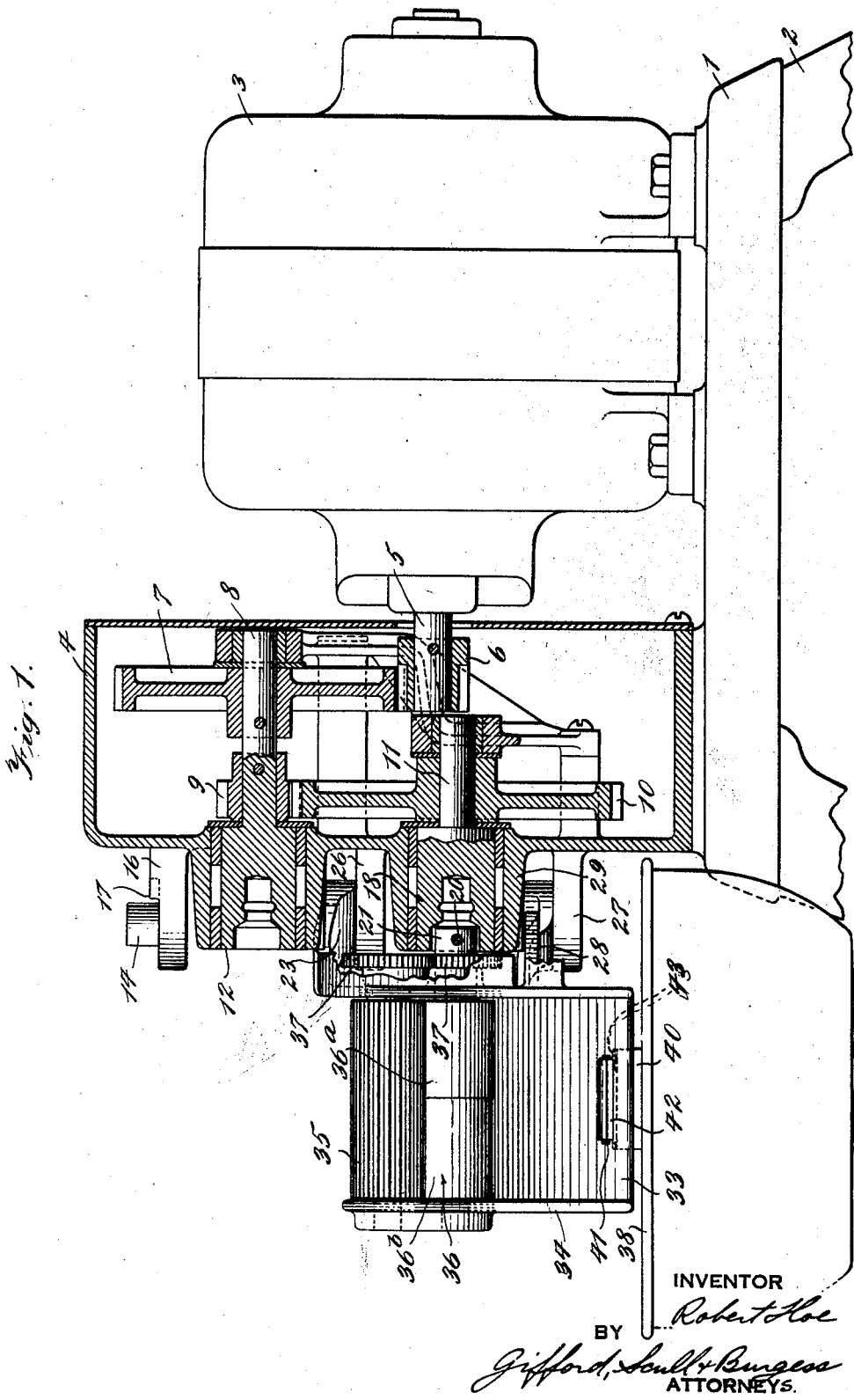
Fig. 1 is a vertical view partly in elevation and partly in section showing the shelling apparatus and the operating mechanism therefor.

In the embodiment shown, the apparatus is supported upon a suitable base 1 which in turn may be supported by legs 2, and on this base is a motor 3 and a gear box 4. The shaft 5 of the motor has thereon a pinion 6 meshing with a gear 7 on a shaft 8, and this shaft also has a pinion 9 meshing with a gear 10 upon a shaft 11.

The shafts 8 and 11 have outlets in the form of clutch elements, by means of which different attachments may be driven, it being noted that the shaft 8 will rotate at a speed substantially greater than the shaft 11. The shaft 8 has an enlargement 12 provided with oppositely disposed recesses 13 adapted to receive clutch elements on a device which may be operated from the shaft 8 when the device is mounted upon the hinge pins 14 and 15. As the speed of rotation of this shaft is greater than is advisable for certain devices, the ear 16 upon which the pin 14 is mounted, is provided with a lug 17 which will prevent placing upon this pin a cooperating hinge member on any device which is not adapted to be rotated at the speed of the shaft 8. It is of course to be understood that such devices will have ears with perforations therein, one of which would receive the pin 14, and this ear is made especially large so that it will engage the lug 17 and prevent seating of the ear upon the pin 14.

The shaft 11 is likewise provided with an enlargement 18 having recesses 19 adapted to receive a clutch element here shown as a transversely extending pin 20 in a shaft 21 on the shelling apparatus. The shelling apparatus is shown as being mounted upon a bracket 22 having ears 23 and 24 provided with perforations adapted to receive the hinge pins 15 and 25, these pins being mounted on ears 26 and 27 projecting from the gear box 4. By this arrangement the shelling apparatus may be swung into and out of operative position, normally the apparatus being placed upon the hinge pins 15 and 25 and then swung into position wherein the pin 20 will be received in the recesses 19 so that upon rotation of the shaft 11 the shaft 21 will also be rotated. When in this position, a lug 28 on the apparatus projects beneath the boss 29 in which the shaft 11 is journaled, so as to prevent displacement of the apparatus transversely of the gear box. The apparatus may be held in position by means of a spring-pressed latch 30 which has a slot 31 adapted to receive a pin 32 upon the bracket.

The shelling apparatus comprises an apron 33 inclined downwardly as shown, and on its opposite sides this apron has upwardly extending walls 34 which serve to keep on the apron the shelled vegetables passing down it, and also serve as bearings for the shafts carrying the shelling rollers 35 and 36. One of these shafts shown as carrying the roller 36 may be the driven shaft 21 which is clutched to the shaft 11, while the other roller may be driven from the roller 36 by means of intermeshing pinions 37 mounted on the respective shafts of the two rollers. As plainly shown, one of the rollers, as the roller 35, is corrugated lengthwise, while the other roller is smooth. The smooth roller is shown as comprising two portions having different diameters, the portion 36$^a$ being of relatively large diameter and the portion 36$^b$ being of relatively small diameter, so that there is a larger space between the roller 35 and the surface of the portion 36$^b$ than there is between the roller 35 and the surface of the portion 36$^a$. This arrangement finds utility in the shelling of vegetables having pods of different sizes. For example, in shelling peas, those having small pods may be fed by hand between the roller 35 and the portion 36$^a$, whereas those having larger pods and which would have difficulty in passing through this space, may be put through the space between the roller 35 and the portion 36$^b$.

It is understood that the motor may be turned on so that the rollers continually rotate, and the vegetables may be fed to the apparatus by hand, from the right, as viewed in Figs. 2 and 4. The pods will pass between the rollers, the contents of the pods being squeezed out and falling onto the apron 33, down which they will roll or slide and pass into the container 38 supported below the lower edge of the apron. In order to conveniently and effectively support the container in proper relation to the apron, the container is provided with a hook in the form of a plate 39 secured to one side of the container having the usual rim as plainly shown, this plate being provided with a part 40 which, when the parts are in operative position, extends approximately nomal to the apron. This part 40 is somewhat wider than a slot 41 formed in the apron adjacent its lower edge and extends transversely thereof, and has a somewhat narrower portion forming a tongue 42 which extends through the slot and is bent so that its end is pointed towards the lower edge of the apron, as plainly shown in the drawings, particularly in Fig. 2. By this arrangement, a shoulder 43 is formed at each side of the tongue 42. The result is that by tipping the container upwardly, the tongue 42 may be slipped through the slot 41 and then the container may be allowed to drop and the tongue and shoulders will engage the top and bottom respectively, of the apron, and hold the container positively in correct position with respect to the apron and with the rim of the container approximately in horizontal position.

While I have shown the invention as embodied in a certain form, it is to be understood that various changes may be made without departing from the scope of the invention as defined by the appended claims.

I claim:—

1. A shelling apparatus comprising a pair of rollers mounted parallel to each other and between which vegetables to be shelled are adapted to be passed, an inclined apron disposed beneath said rollers to receive shelled vegetables from the rollers, said apron having an opening therein, a container, and means on said container adapted to be received in said opening to support the container on the apron, said means comprising a hook having a tongue extending through the opening and engaging the upper side of the apron and pointing towards the lower edge of the apron.

2. A shelling apparatus comprising a pair of rollers mounted parallel to each other and between which vegetables to be shelled are adapted to be passed, an inclined apron disposed beneath said rollers to receive shelled vegetables from the rollers, said apron having an opening therein, a container, means on said container adapted to be received in said opening to support the container on the apron, said means comprising a hook having a tongue extending through the opening and engaging the upper side of the apron and pointing towards the lower edge of the apron, and a shoulder engaging the under side of the apron.

3. A shelling apparatus comprising a pair of rollers mounted parallel to each other and between which vegetables to be shelled are adapted to be passed, an inclined apron disposed beneath said rollers to receive shelled vegetables from the rollers, said apron having a transverse slot therein, a container, and a hook on said container having a tongue adapted to be received in said slot to support the container in position to receive said vegetables.

4. A shelling apparatus comprising a pair of rollers mounted parallel to each other and between which vegetables to be shelled are adapted to be passed, an inclined apron disposed beneath said rollers to receive shelled vegetables from the rollers, said apron having a transverse slot therein, a container, and a wide hook on said container having a tongue extending substantially the length of said slot and disposed therein, the end of the tongue resting on top of the apron and pointing towards the lower edge thereof.

5. A shelling apparatus comprising a pair of rollers mounted parallel to each other and between which vegetables to be shelled are adapted to be passed, an inclined apron disposed beneath said rollers to receive shelled vegetables from the rollers, said apron having a transverse slot therein, a container, a wide hook on said container having a tongue extending substantially the length of said slot and disposed therein, and shoulders on opposite sides of said hook engaging the under side of the apron, the end of the tongue resting on top of the apron and pointing towards the lower edge thereof.

6. A shelling apparatus comprising a pair of rollers mounted parallel to each other and between which vegetables to be shelled are adapted to be passed, an inclined apron disposed beneath said rollers to receive shelled vegetables from the rollers, said apron having a transverse slot therein, a container, and a wide hook on said container having a tongue extending substantially the length of said slot and disposed therein, the end of the tongue resting on top of the apron.

7. A shelling apparatus comprising a pair of rollers mounted parallel to each other and between which vegetables to be shelled are adapted to be passed, an inclined apron disposed beneath said rollers to receive shelled vegetables from the rollers, said apron having a transverse slot therein, a container, a wide hook on said container having a tongue extending substantially the length of said slot and disposed therein, and shoulders on opposite sides of said hook engaging the under side of the apron, the end of the tongue resting on top of the apron.

ROBERT HOE.